United States Patent [19]

Park

[11] Patent Number: 5,076,609

[45] Date of Patent: Dec. 31, 1991

[54] ELECTRONIC CONTROL METHOD OF A CAR SAFETY BELT

[75] Inventor: Han J. Park, Chongju, Rep. of Korea

[73] Assignee: Goldstar Instrument & Electric Co., Ltd., Seoul, Rep. of Korea

[21] Appl. No.: 549,385

[22] Filed: Jul. 6, 1990

[51] Int. Cl.$^5$ .............................................. B60R 22/06
[52] U.S. Cl. ................................. 280/804; 340/457.1; 340/459
[58] Field of Search ............... 340/459, 523, 517, 438, 340/457.1, 457; 280/802, 803, 804, 807; 180/268

[56] References Cited

U.S. PATENT DOCUMENTS

| | | | |
|---|---|---|---|
| 1,805,863 | 3/1932 | Brown | 340/459 |
| 4,236,141 | 11/1980 | Terabayashi | 280/802 |
| 4,268,816 | 5/1981 | Matsuoka et al. | 340/457.1 |
| 4,321,979 | 3/1982 | Kuroyama et al. | 280/804 |
| 4,380,751 | 4/1983 | Takada | 340/457.1 |
| 4,896,741 | 1/1990 | Kawai | 180/268 |

*Primary Examiner*—Charles A. Marmor
*Assistant Examiner*—Karin Tyson
*Attorney, Agent, or Firm*—Fliesler, Dubb, Meyer & Lovejoy

[57] ABSTRACT

An automatic conveying system of a car safety belt that controls various alarm functions and directions of a motor for releasing and fastening of the belt with an electronic controller constituted in such that a control unit scans switch states according to key inputs, and drives an alarm lamp, an alarm buzzer, an alarm chime, a solenoid and a driving motor. The control method provides the users of a car safety belt with convenience, and also solves problems of the prior relay-type control system such as high cost, largely occupied space and difficulty in checking when in trouble.

6 Claims, 7 Drawing Sheets

ELECTRONIC CONTROL METHOD OF A CAR SAFETY BELT

BACKGROUND OF THE INVENTION

The present invention relates to an automatic conveying system of a car safety belt, more especially to an electronic control method of a car safety belt that controls various alarm functions and directions of a motor for releasing and fastening of the belt by using a microprocessor.

Generally, a car safety belt mounted on the seats is to be manually buckled for the safety of the driver and passenger, and the users of the belt, such as drivers and passengers, come to require a belt system with far more convenient functions.

For the relay-type control of the prior car safety belt as shown in FIG. 1, a starting switch SW1, a door switch SW2, a speed switch SW3, a backward switch SW4, a conveying position releasing switch SW5, a conveying position fastening switch SW6 and a lap belt buckle switch SW7 which are mounted in a car are electrically connected to a start sensing relay RY1, a door sensing relay RY2, a speed sensing relay RY3, a backward sensing relay RY4, a conveying position releasing relay RY5 and a conveying position fastening relay RY6 in the control unit 2 respectively, so that the determination of a rotational direction of the motor according to the operational state of the above relays causes the belt conveying system to move forward or backward (releasing position or fastening position) as well as to give the alarm through the alarm lamp L1 on malfunctioning.

In FIG. 1, the motor drive relay 3 is a conventional switch for control the operation of the motor. Switch 3 includes two single-pole, double-throw switches for connecting the B+ and ground connections to the motor under control of the control unit 2. With the switch contacts thrown as shown, both of the terminals of the motor are connected to ground and hence the motor is in the stationary, non-driven state. If control unit 2 causes one of the switch contacts to be thrown, then the motor will have the B+ voltage applied to one terminal of the motor while the other terminal of the motor remains connected to ground, hence driving the motor in a first direction. If the other of the switch contacts is thrown by operation of control unit 2 and the first contact remains as shown, then the B+ voltage will be applied to the other of the terminals of the motor leaving the first terminal connected to ground and hence the motor will be driven in the opposite direction. If both of the double-pole switch contacts of FIG. 3 are actuated by the control unit 2, then both terminals of the motor will be connected to the B+ voltage and hence the motor will be in the stationary, non-driven state. Switch 3 is a conventional motor control unit well known in existing car safety belt systems. However, the above relay-type control method of the safety belt has problems in that the necessity of relays corresponding to respective input signals makes cost high and the space occupied by them large, and in that life of the relays' electric contacts becomes shortened.

Another problem for the relay-type control method goes to a difficulty in checking when the connected peripherals are in trouble because each of the contacts of the relays are connected with each other in order for the motor of the travel system to perform simple functions such as stopping, a forward direction rotation and a reverse direction rotation.

SUMMARY OF THE INVENTION

The object of the invention is to provide an automatic conveying of a car safety belt, alarm functions according to abnormal states of the conveying system, a door alarm, and a self-diagnosis performance of abnormal states of the motor overcurrent protection function and peripherals by using the functions of a microprocessor.

The object of the present invention is accomplished by checking the self-diagnostic request signal from the outside, reading the input switch corresponding memory, motor conveying logic register, solenoid operation register and alarm output register, shifting and outputting them one bit by one bit to the specified port of the microprocessor.

DETAILED DESCRIPTION OF THE INVENTION

Detailed description of the present invention will be given below with reference to the accompanying drawings.

Figure 1:
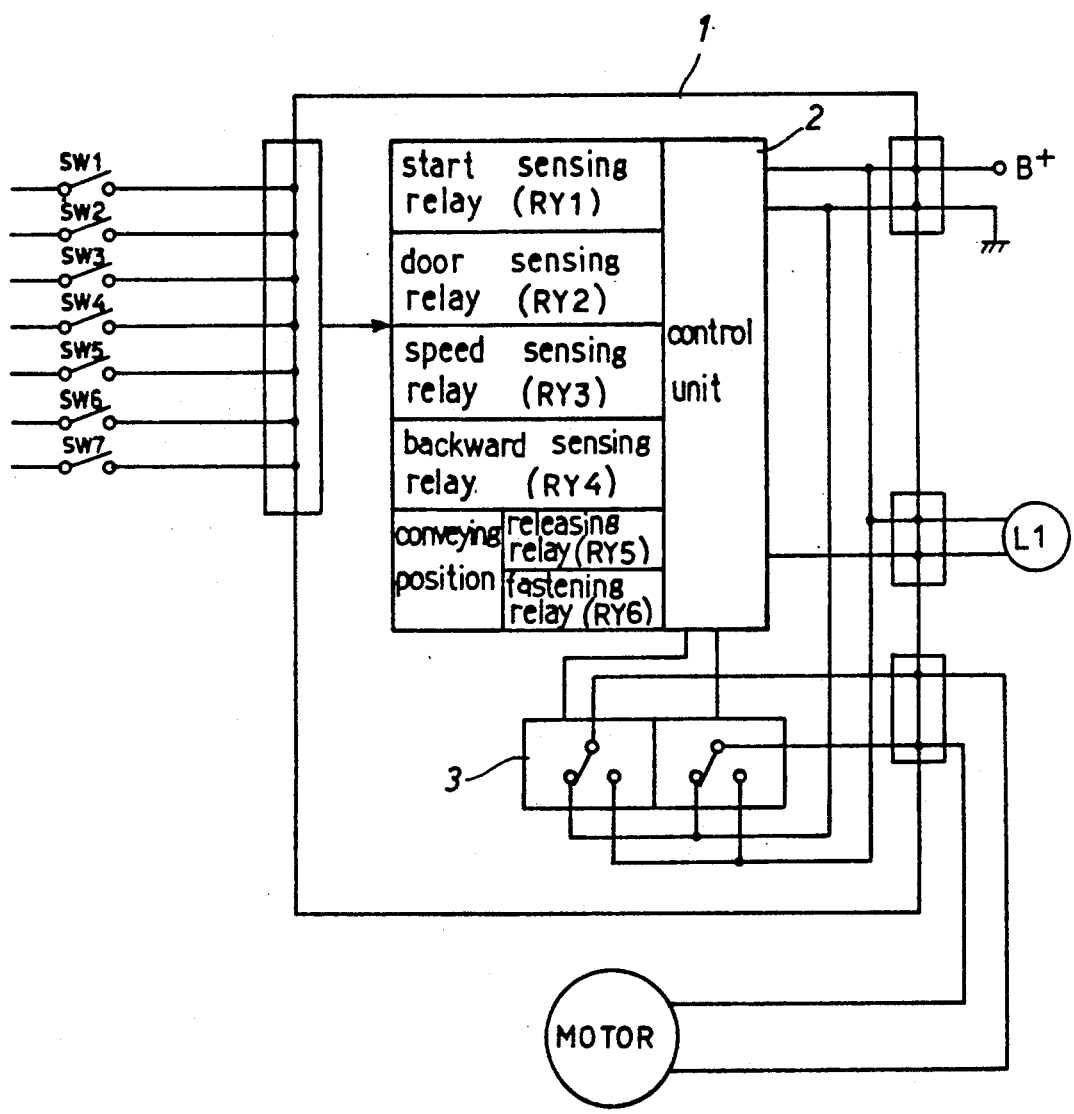
FIG. 1 is a view illustrating the structure of a relay type controller of a conventional car safety belt.
Figure 2:
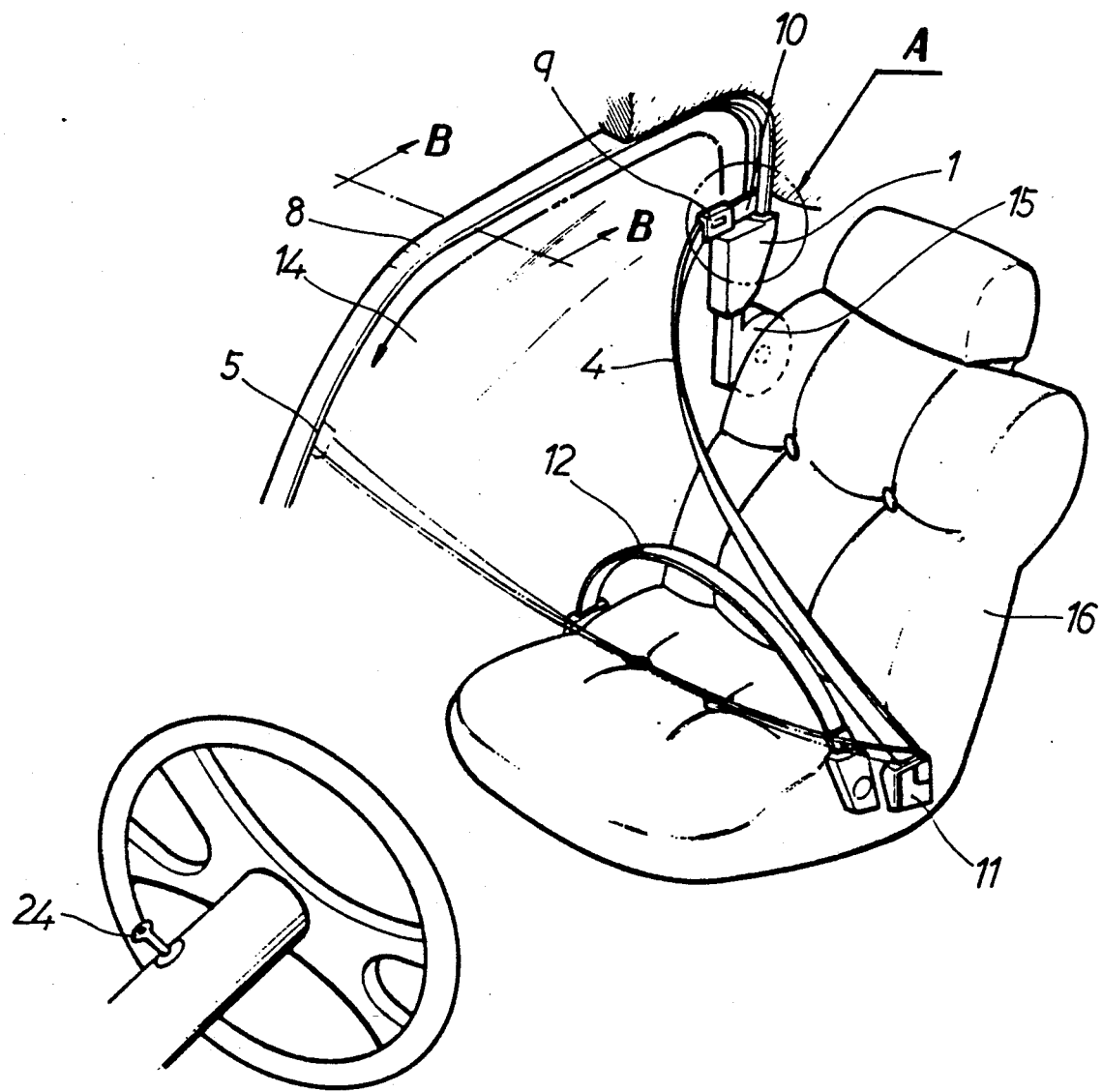
FIG. 2 is an explanatory view for showing the belt conveying by means of an electronic controller for a car safety belt according to the present invention.
Figure 3:
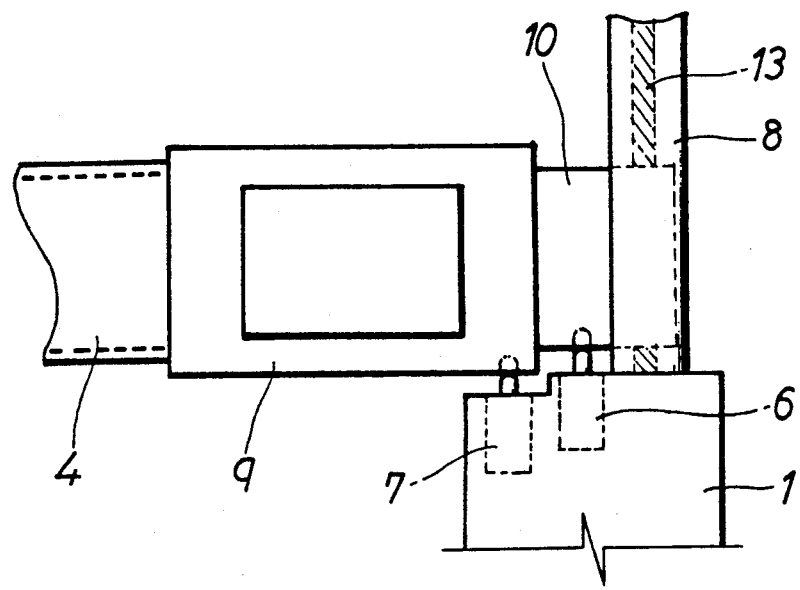
FIG. 3 is a detailed view for the section A of FIG. 2.
Figure 4:
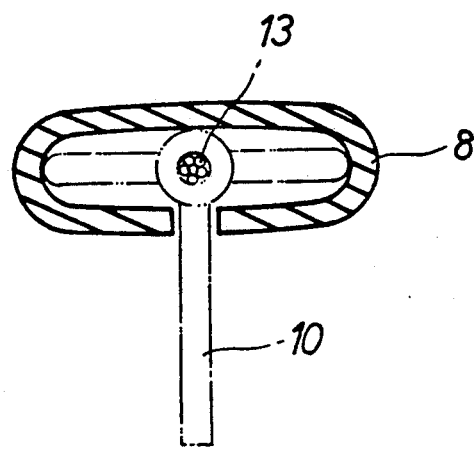
FIG. 4 is a cross-sectional view taken along the line B—B of FIG. 2.

Referring to FIG. 2 to FIG. 4, reference number 8 designates cantrail formed on the body over the top of the door 14, and the rail 8 is of the "C" type, which is attached to the body. Wire 13 movable to the right and to the left is inserted longitudinally in the rail 8. A buckle attaching/detaching means 10 is fixed at one end of said wire 13, which moves to the right and to the left according to the conveying of the wire 13, so that the buckle attaching/detaching means 10 turns the conveying releasing switch 5 and the conveying fastening switch 6 fixed at the ends of the rail 8 on and off. The electronic controller 1 and a roller 15 winding the wire 13 by driving the motor are located at one end of said rail 8, a belt draw-out means 11 having a solenoid (SO) is fixed at a seat in order for a diagonal belt 4 to be drawn into/out of the belt draw-out means 11 when the solenoid (SO) is turned on/off. A belt buckle 9 is fixed at one end of the diagonal belt 4, a diagonal belt buckle switch 7 fixed at the rail 8 in an opposite side of the conveying fastening switch 6 is turned on/off when said buckle attaching/detaching means 10 is attached or detached, a lap belt 12 for a user is mounted on a seat, a door switch 17 is fixed on the body of the car in order to be turned on/off when said door 14 is closed or opened.

In the drawings, reference numeral 24 designates an ignition key inserted in the axis pole of a steering wheel.

Figure 5:
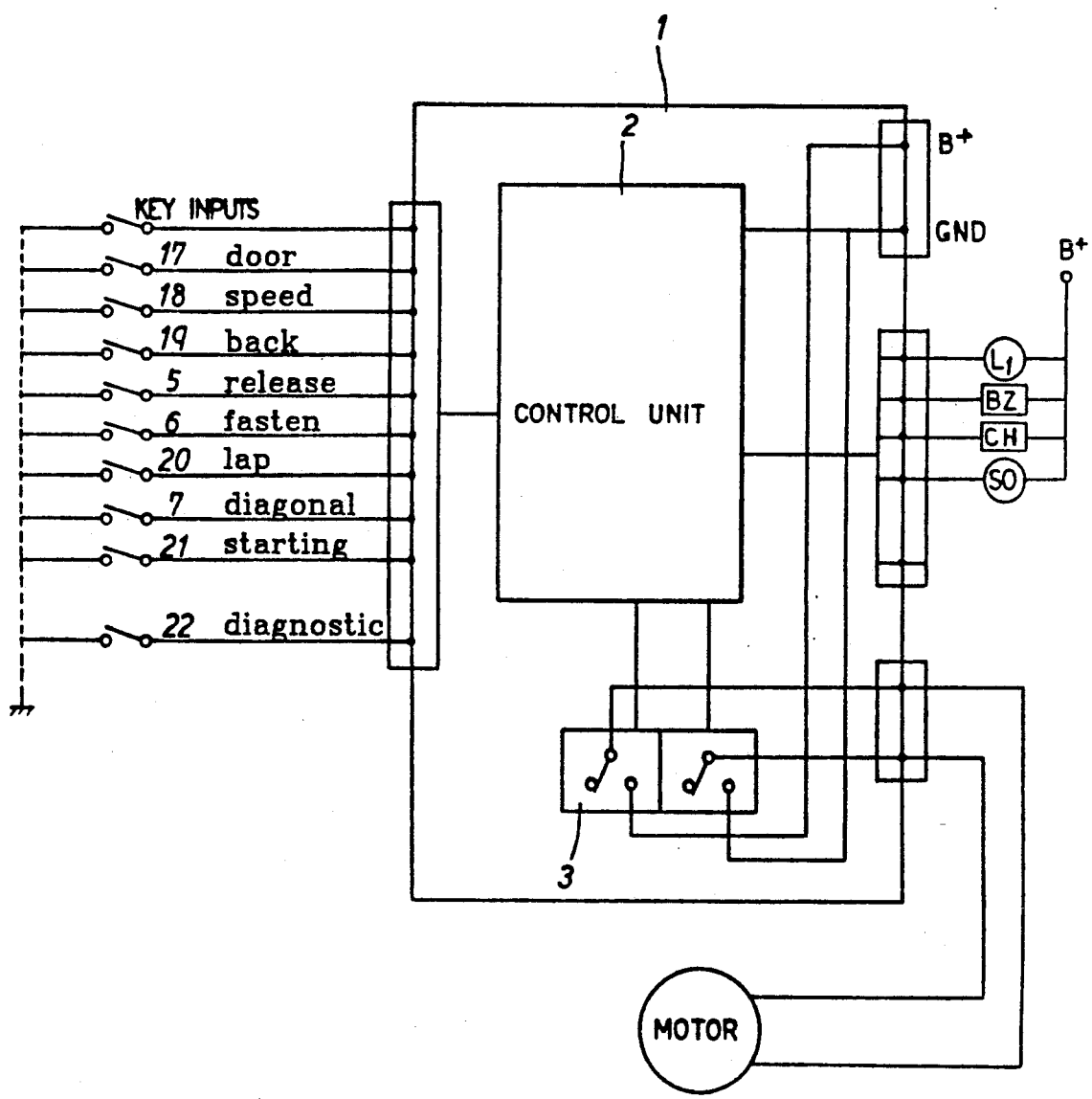
FIG. 5 is a view illustrating the structure of the electronic controller for a car safety belt according to the present invention.

Referring now to FIG. 5, the electronic controller is constructed by a control unit 2 which scans the states of a door switch 17, a speed sensor 18, a backward switch 19, a conveying releasing switch 5, a conveying fastening switch 6, a lap belt buckle switch 20 which is turned on/off when the lap belt 12 is attached or detached, a starting switch 21, and a diagnostic request switch 22, to drive an alarm lamp L1, an alarm buzzer (BZ), an alarm chime (CH) and a solenoid (SO) for prohibiting the belt drawing out, and to drive the motor through a motor drive relay 3.

The present invention having such a configuration will be described below with reference to FIG. 6 which is a signal flowchart for a self-diagnostic request and a motor conveying direction. At first, input/output ports are designated by initializing the process of the control unit 2 of the electronic controller 1, and after clearing the memory each of the input states of the starting switch 21, door switch 17, backward switch 19, and speed sensor 18 are scanned to set corresponding memories of each of the switches, and then the rotational direction of the motor is determined.

Figure 7:
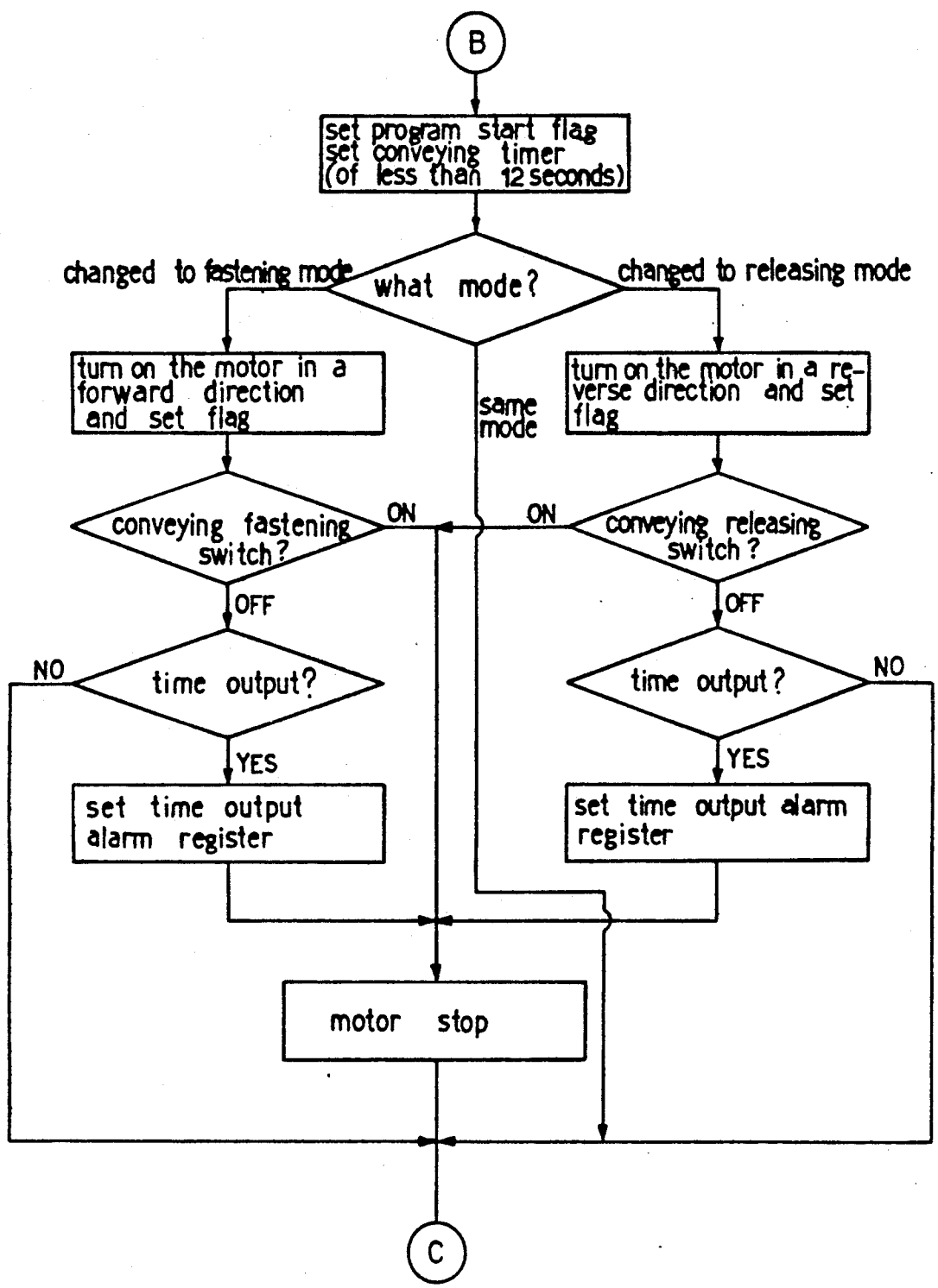
FIG. 7 is a signal flowchart for the motor conveying of a car safety belt according to the present invention.

At the same time, motor conveying mode checking and setting of the register are performed and then checking whether or not the motor conveying is necessary. If necessary, the motor conveying operation is performed as shown in FIG. 7, and if not, alarm mode checkout and register checking operations are performed, and then outputting alarm signals depending upon the kind of each mode by discriminating the alarm mode.

The conveying function of the motor will be described below with reference to FIG. 7 which is a signal flowchart. At first, the program start flag and a conveying timer of less than 12 seconds are set, and the conveying mode is checked.

When the locking mode is detected, that is, when the car is started at speed below 3 miles per an hour and the door is closed or the car is running at speed over 3 miles per an hour, the conveying fastening operation of the diagonal belt 4 allows the solenoid (SO) to be turned on in order for a free conveying of the diagonal belt 4 to be made. When the flag is set after turning the motor on in a forward direction, the motor is rotated in a forward direction while the roller 15 rotated to wind the wire 13. The buckle attaching/detaching means 10 connected with the diagonal belt 4 and the belt buckle 9 travels along the rail 8 as said wire 13 is wound. When reaching the fastening position, that is, when the conveying fastening switch 6 is pressed by the buckle attaching/detaching means 10, the conveying fastening switch 6 is turned on, the rotation of the motor is stopped, the solenoid (SO) is turned on, and the diagonal belt 4 is not drawn out of the belt draw-out means 11. When the output of the timer is applied in the state that the conveying fastening switch 6 is turned off, the output is set in the alarm register and then the motor is stopped.

When the conveying mode of the motor is changed to the releasing mode, that is, when the car speed is below 3 miles per an hour and the car is not started, or when the car is started but not moving, the door 14 is opened and the reverse gear is not active, possibility of the passenger's getting on and off exists. Therefore, the solenoid (SO) is turned on in order for the conveying of the diagonal belt 4 and the knee belt 12 to be made free, and the motor is turned on in a reverse direction.

In such a state, when the flag is set, the motor is rotated in a reverse direction while the wire 13 wound around the roller 15 is released. Thereby, the diagonal belt 4, the belt buckle 9 and the buckle attaching-/detaching means 10 travel to the left along the rail 8 as the wire 13 is released. When reaching the releasing position, that is, when the conveying releasing switch 5 is pressed to be turned on by the buckle attaching-/detaching means 10, the rotation of the motor is stopped and the solenoid (SO) is turned off.

When the output of the timer is applied in the state that the conveying releasing switch 5 is turned off, the output is set in the alarm register and then the motor is stopped.

When the car is started, the door 14 is opened and the reverse gear is active, the driver can look back out the door 14 for a backward driving. At this time, in order to mitigate the fastening of the diagonal belt 4 from the fastening state of the diagonal belt 4, only the solenoid (SO) is turned on, which the diagonal belt 4 is drawn out of the belt draw-out means 11, causing the belt fastening to be mitigated.

Accordingly, the diagonal belt 4 is fastened by driving the motor in a forward direction for 12 seconds in the fastening mode, and the diagonal belt 4 is released by driving the motor in a reverse direction for 12 seconds in the releasing mode. When the conveying mode of the motor is not changed, that is, when the conveying of the motor is not necessary, a routine for an alarm mode check and register settings is directly performed. As mentioned above, the on/off states of the belt buckle switch 7, the conveying fastening switch 6, the conveying releasing switch 5, the door switch 17, and the knee belt buckle switch 20 are scanned, to set the corresponding memory flags, so that the alarm output is decided.

At the same time, the alarms for the overload of the motor, the output of the conveying time out, the unwear state of the diagonal belt 4 and the knee belt 12, and the opening of door 14 are decided according as the alarm mode is checked and the register is set.

Figure 8:
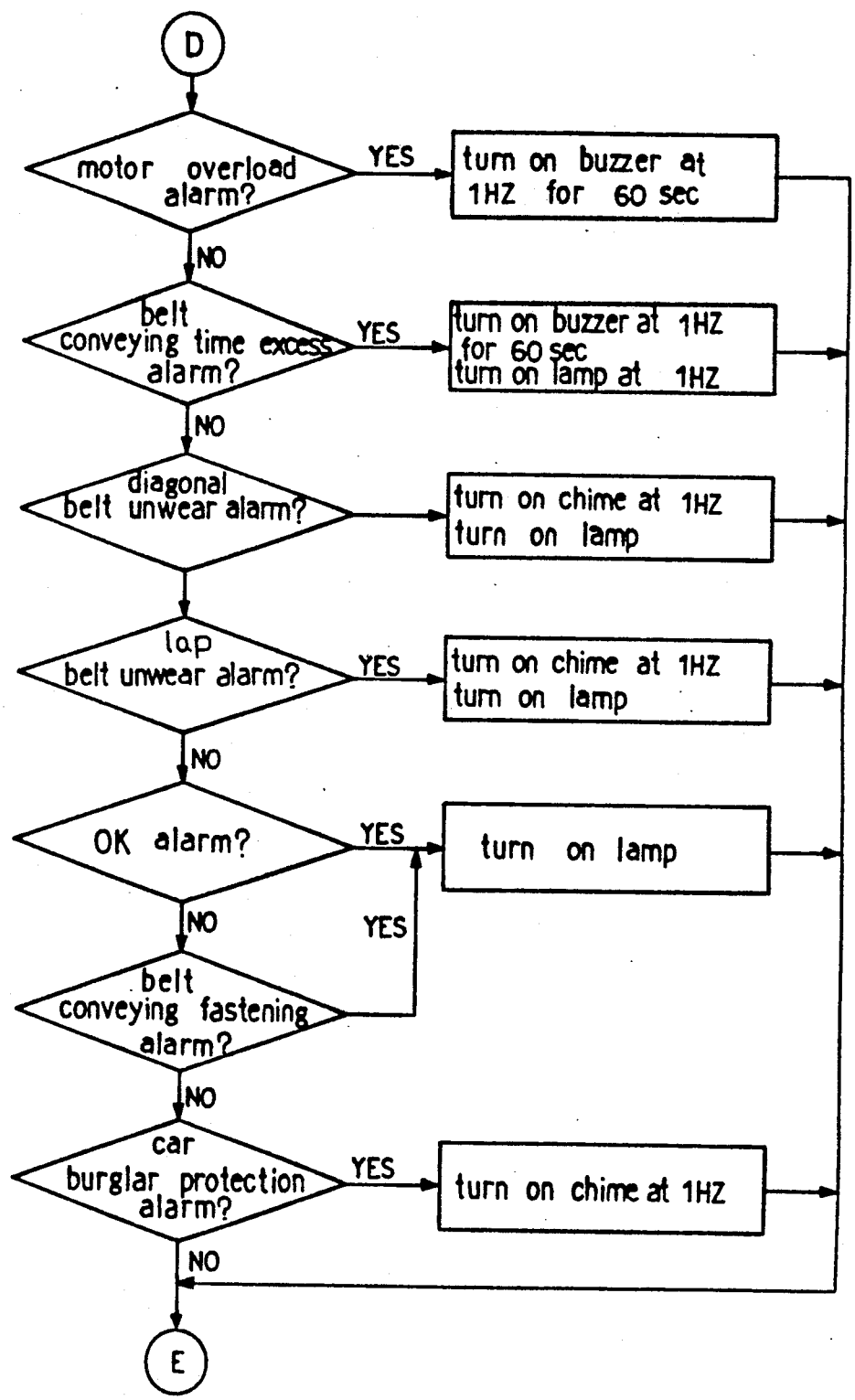
FIG. 8 is a signal flowchart for the alarm mode of a car safety belt according to the present invention.

The functions of such alarm modes will be described below with reference to FIG. 8 which is a signal flowchart.

In the alarm mode of the state that the alarm mode check and the registers are set, when the motor overload alarm is active, that is, when an overcurrent is conducted in the motor, the buzzer (BZ) is active at frequency of 1 HZ for 60 seconds because the belt conveying system is abnormal. Thereafter, when the conveying of the diagonal belt 18 is not made within 12 seconds in the state that the car is started, the buzzer (BZ) is active at frequency of 1 HZ for 60 seconds while the lamp L1 blinks at frequency of 1 HZ as a belt travel time excess alarm with decision that the conveying system of the diagonal belt 18 is abnormal. Thereafter, when the belt buckle 9 of the diagonal belt 4 is not inserted in the belt attaching/detaching means 10 following a car start, the buzzer (BZ) is active at frequency of 1 HZ for 6 seconds while the lamp L1 blinks at frequency of 1 HZ. When the knee belt 12 is not inserted in the buckle within 6 seconds after a car is started, the chime rings at frequency of 1 HZ while the lamp L1 is turned on. Thereafter, the lamp L1 is turned on in case that the belt system has no problem within 6 seconds after a car is started, the lamp L1 is turned on as a belt conveying fastening alarm when the belt conveying is active for fastening after a car is started. When the door is opened while the ignition key 24 remains inserted in the state that a car is not started, the chime (CH) is active at frequency of 1 HZ as a car burglar protection alarm.

Figure 6:
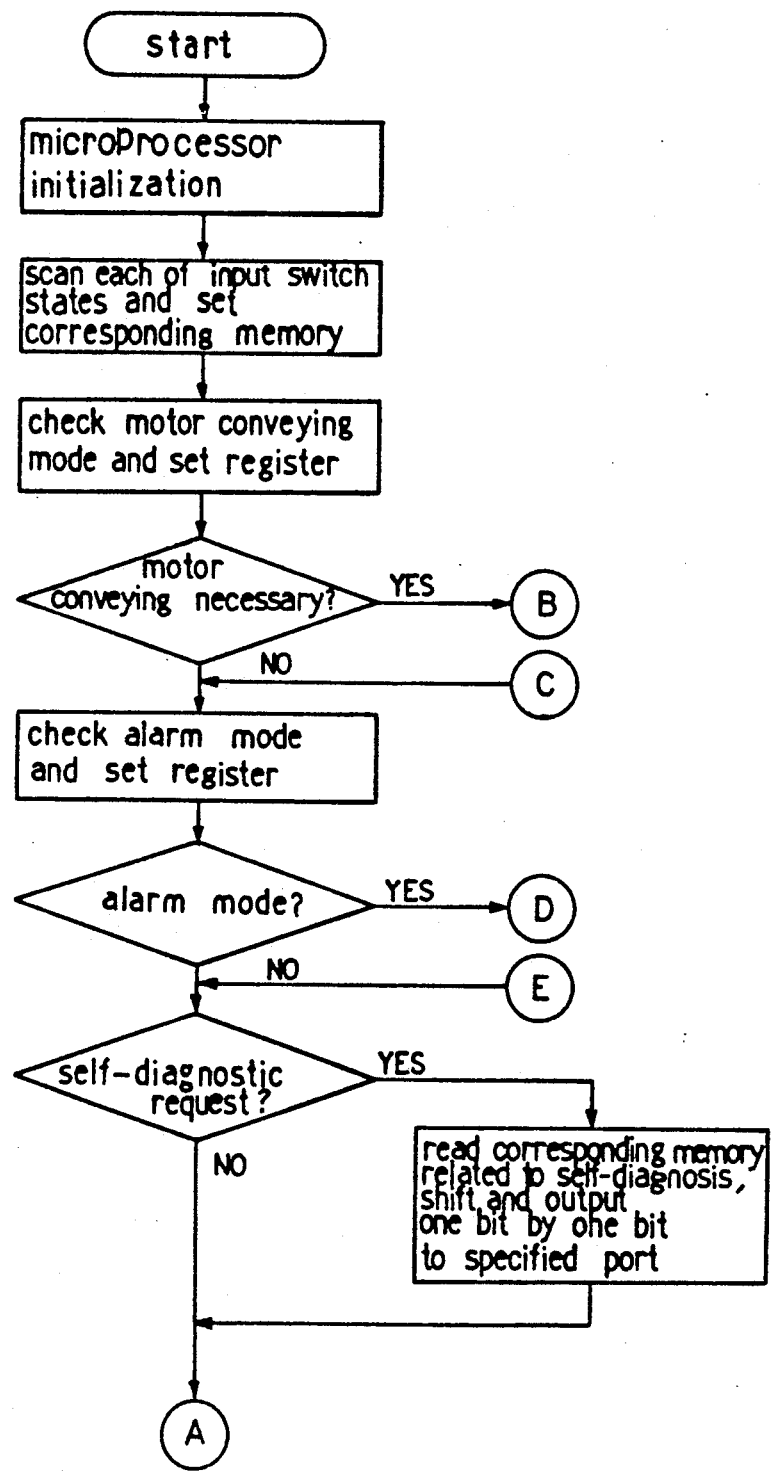
FIG. 6 is a signal flowchart for a self-diagnostic request and a motor conveying direction for a car safety belt according to the present invention.

As shown in FIG. 6, check whether or not a self-diagnostic request signal exists, read an input switch corresponding memory, a motor conveying logic register, a solenoid operation register and an alarm output register, shift and output one bit by one bit to a specified port, so that each of the alarms for motor overload, belt detachment, door and conveying time are performed.

As described above, the present invention has the effect that reduces cost of the product by performing the automatic safety belt wear through the microcomputer control and provides the users with convenience due to addition of alarm functions that copes with abnormal working of the system.

What is claimed is:

1. A method for electronically controlling a car safety belt, comprising the steps of:

providing an electronic controller constructed in order for a control unit to scan each of the switch states according key inputs, to drive an alarm lamp, an alarm buzzer, an alarm chime and a solenoid for prohibiting the belt from being drawn out of a retractor, and to drive a driving motor through a motor driving relay for moving the safety belt to and from an in-use position;

checking the register of a motor conveying after setting each of the input switch signals in the corresponding memory;

performing a motor conveying routine when conveying of said driving motor is necessary;

driving a solenoid according to the driving mode of said solenoid;

performing a corresponding alarm subroutine according to each of the alarm modes after checking alarm output registers; and checking diagnostic request signals to read each of the input switch corresponding memories, a motor conveying logic register, a solenoid operation register and an alarm output register, and then checking each of the corresponding ports.

2. The method as claimed in claim 1, wherein the motor conveying routine drives the motor in a forward direction for a certain time period when the conveying mode of the driving motor is a fastening mode by checking thereof in order for the fastening function of the safety belt to be performed, mitigates the fastening of the safety belt by turning the solenoid on when in the migration mode to allow the safety belt to be drawn out from the retractor, performs the releasing function of the safety belt by driving the motor in the reverse direction for a certain time period when in the releasing mode, and performs the next routine when in the same mode.

3. A method for electronically controlling a car safety belt where the safety belt has a rail end adapted to be driven along a rail by a driving motor controlled by a motor drive signal, where the safety belt is adapted to be drawn into or out from belt draw means where a plurality of switches provide switch states for controlling the safety belt, and where electronic control means is provided for sensing the switches, comprising the steps of:

checking the setting of each of the input switches;

performing a motor conveying routine as a function of the switch settings to provide the motor drive signal for controlling the driving of the rail end along the rail;

controlling the drawing of the safety belt into or out from the belt draw means as a function of the switch settings.

4. The method of claim 3 wherein said switches include one or more alarm switches and further including the step of performing an alarm routine as a function of the settings of the one or more alarm switches.

5. The method of claim 3 wherein said switches include a diagnostic switch and further including the step of performing an diagnostic routine as a function of the setting of the diagnostic switch.

6. A method for electronically controlling a car safety belt where the safety belt has a rail end adapted to be driven along a rail by a driving motor controlled by a motor drive signal, where the safety belt is adapted to be drawn into or out from belt draw means where a plurality of switches, including one or more alarm switches, a diagnostic switch, provide switch states for controlling the safety belt, and where electronic control means is provided for sensing the switches where said electronic control means includes a motor conveying logic register, a draw control register and an alarm register, comprising the steps of:

checking the setting of each of the input switches and said registers, performing a motor conveying routine as a function of the switch settings and the register settings to provide the motor drive signal for controlling the driving of the rail end of the safety belt along the rail, controlling the drawing of safety belt into or out from the belt draw means as a function of the switch settings, performing an alarm routine as a function of the settings of the one or more alarm switches and the register settings, performing an diagnostic routine as a function of the setting of the diagnostic switch and the register settings.

* * * * *